(12) United States Patent
Wang et al.

(10) Patent No.: US 11,451,345 B2
(45) Date of Patent: *Sep. 20, 2022

(54) DATA TRANSMISSION METHOD, TERMINAL, AND RAN DEVICE

(71) Applicant: Huawei Technologies Co., Ltd., Shenzhen (CN)

(72) Inventors: Yifan Wang, Shanghai (CN); Lian Li, Shanghai (CN); Xiangzhen Kong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 54 days.

This patent is subject to a terminal disclaimer.

(21) Appl. No.: 16/792,657

(22) Filed: Feb. 17, 2020

(65) Prior Publication Data
US 2020/0186300 A1 Jun. 11, 2020

Related U.S. Application Data

(63) Continuation of application No. 15/917,015, filed on Mar. 9, 2018, now Pat. No. 10,594,447, which is a
(Continued)

(51) Int. Cl.
*H04L 1/18* (2006.01)
*H04W 76/28* (2018.01)
(Continued)

(52) U.S. Cl.
CPC .......... *H04L 1/1854* (2013.01); *H04L 1/1812* (2013.01); *H04L 5/0055* (2013.01);
(Continued)

(58) Field of Classification Search
CPC ... H04L 1/1854; H04L 1/1812; H04L 5/0055; H04L 1/00; H04W 52/02;
(Continued)

(56) References Cited

U.S. PATENT DOCUMENTS 10,594,447 B2 * 3/2020 Wang ................ H04W 28/0278
2009/0168731 A1 * 7/2009 Zhang .................. H04L 1/1854
370/336

(Continued)

FOREIGN PATENT DOCUMENTS

CN 101483884 A 7/2009
CN 101616475 A 12/2009
(Continued)

OTHER PUBLICATIONS

English translation of international search report for PCT/CN2015/089394; dated Jul. 3, 2016 (Year: 2016).*
(Continued)

*Primary Examiner* — Benjamin H Elliott, IV
(74) *Attorney, Agent, or Firm* — Slater Matsil, LLP

(57) ABSTRACT

A data transmission method is provided to resolve a problem of data transmission delay in a DRX mechanism. A RAN device sends, to a terminal in a DRX active period, first grant information that is used to perform initial transmission grant for first data. The RAN device sends, to the terminal in a retransmission active time in which the terminal expects to receive a retransmission grant for the first data, second grant information that is used to perform initial transmission grant for second data. Then the RAN device and the terminal remain in an active state in an activation extension time that is after sending of the second grant information.

13 Claims, 6 Drawing Sheets

S310
A terminal receives, in a DRX active period, first grant information sent by an RAN device, where the first grant information is used to perform initial transmission grant for first data, and the initial transmission may be uplink initial transmission or may be downlink initial transmission S320
The terminal receives, in a retransmission active time, second grant information sent by the RAN device, where the second grant information is used to perform initial transmission grant for second data S330
The terminal remains in an active state in an activation extension time that is after receiving of the second grant information

Related U.S. Application Data continuation of application No. PCT/CN2015/089394, filed on Sep. 10, 2015.

(51) Int. Cl.
*H04W 52/02* (2009.01)
*H04L 5/00* (2006.01)
*H04W 28/02* (2009.01)
*H04W 72/12* (2009.01)
*H04W 72/04* (2009.01)

(52) U.S. Cl.
CPC ....... *H04W 28/0278* (2013.01); *H04W 52/02* (2013.01); *H04W 52/0216* (2013.01); *H04W 52/0229* (2013.01); *H04W 76/28* (2018.02); *H04W 72/042* (2013.01); *H04W 72/1289* (2013.01); *Y02D 30/70* (2020.08)

(58) Field of Classification Search
CPC ........ H04W 52/0216; H04W 28/0278; H04W 76/28; H04W 76/20; H04W 72/1289; H04W 72/042; H04W 52/0209
See application file for complete search history.

(56) References Cited

U.S. PATENT DOCUMENTS

| | | | | |
|---|---|---|---|---|
| 2009/0181670 A1* | 7/2009 | Tseng | .................. | H04L 1/1848 455/434 |
| 2009/0316593 A1* | 12/2009 | Wang | ................ | H04W 74/0833 370/252 |
| 2011/0026625 A1* | 2/2011 | Susitaival | ......... | H04W 52/0251 375/260 |
| 2011/0205928 A1* | 8/2011 | Pelletier | ................ | H04W 24/00 370/252 |
| 2012/0327783 A1* | 12/2012 | Moon | .................. | H04L 1/1861 370/241 |
| 2013/0223307 A1* | 8/2013 | Ohlsson | ............ | H04W 52/0216 370/311 |
| 2014/0071868 A1* | 3/2014 | Bergquist | .............. | H04W 76/28 370/311 |
| 2014/0219151 A1* | 8/2014 | Damji | ............... | H04W 52/0235 370/311 |
| 2014/0254538 A1* | 9/2014 | Park | ...................... | H04W 56/00 370/329 |
| 2014/0269397 A1* | 9/2014 | Pelletier | ............ | H04W 52/0216 370/252 |
| 2015/0049705 A1* | 2/2015 | Feuersaenger | .... | H04W 72/1215 370/329 |
| 2015/0131504 A1* | 5/2015 | Lin | .................... | H04W 52/0225 370/311 |
| 2015/0181571 A1* | 6/2015 | Park | ....................... | H04W 76/28 370/252 |
| 2015/0201456 A1* | 7/2015 | Lee | ..................... | H04W 72/042 370/311 |
| 2016/0037529 A1* | 2/2016 | Bourlas | ................. | H04L 1/1887 370/329 |
| 2017/0013610 A1* | 1/2017 | Lee | ........................ | H04L 1/1861 |
| 2018/0048498 A1* | 2/2018 | Stern-Berkowitz | ... | H04W 16/14 |
| 2018/0198572 A1* | 7/2018 | Wang | .................... | H04W 76/28 |
| 2020/0186300 A1* | 6/2020 | Wang | .................... | H04W 76/28 |

FOREIGN PATENT DOCUMENTS

| | | |
|---|---|---|
| CN | 102187611 A | 9/2011 |
| CN | 102761942 A | 10/2012 |
| CN | 102843754 A | 12/2012 |
| EP | 2272288 B1 | 3/2014 |
| JP | 2011520378 A | 7/2011 |
| JP | 5307232 B2 | 10/2013 |
| TW | 201001938 A | 1/2010 |
| WO | 2009136830 A1 | 11/2009 |
| WO | 2014146736 A1 | 9/2014 |
| WO | 2015016755 A1 | 2/2015 |

OTHER PUBLICATIONS

3GPP TS 36.213 V12.6.0, "3rd Generation Partnership Project; Technical Specification Group Radio Access Network; Evolved Universal Terrestrial Radio Access (E-UTRA); Physical layer procedures (Release 12)," Jun. 2015, 241 pages.

3GPP TS 36.321, V12.6.0, "3rd Generation Partnership Project; Technical Specification Group Radio Access Network; Evolved Universal Terrestrial Radio Access (E-UTRA); Medium Access Control (MAC) protocol specification (Release 12)," Jun. 2015, 77 pages.

3GPP TSG.RAN WG2 #80, "Email Discussion Report on CSI/SRS reporting at DRX state change," XP050667465 R2-125628 Ericsson (Rapporteur), New Orleans, Louisiana, USA, Nov. 12-16, 2012, 20 pages.

* cited by examiner

DATA TRANSMISSION METHOD, TERMINAL, AND RAN DEVICE

CROSS-REFERENCE TO RELATED APPLICATIONS

This application is a continuation of U.S. patent application Ser. No. 15/917,015, filed on Mar. 9, 2018, which is a continuation of International Patent Application No. PCT/CN2015/089394, filed Sep. 10, 2015. All of the aforementioned patent applications are hereby incorporated by reference in their entireties.

TECHNICAL FIELD

The present disclosure relates to the field of communications technologies, and in particular, to a data transmission method, a terminal, and a radio access network (RAN) device.

BACKGROUND

With development of mobile communications technologies, intelligent terminals are increasingly popular, and services that a terminal can process are increasingly abundant. However, power consumption of the terminal also continuously increases. To improve power saving performance of the terminal, a discontinuous reception (DRX) technology is introduced.

A data stream of packets generally occurs in a burst mode. There is data transmission in a period of time, but no data transmission in a next period of time. The DRX technology is based on this. A DRX cycle is configured, and as shown in FIG. 1, the DRX cycle includes two periods of time: an active period (also referred to as on duration (OD)) and a sleep period (also referred to as opportunity for DRX).

A terminal and a RAN device may maintain a same DRX cycle. The terminal listens to a physical downlink control channel (PDCCH) in an active period, and receives various types of scheduling and other control information carried on the PDCCH, and the terminal does not listen to the PDCCH in a sleep period to reduce power consumption.

Because the terminal does not listen to the PDCCH in the sleep period, a radio access device does not perform scheduling grant in the sleep period, and performs scheduling grant in a next active period. Therefore, a delay of data transmission is increased. In particular, for a service such as a voice service that is delay sensitive, this delay affects user experience.

SUMMARY

Embodiments of the present disclosure provide a data transmission method, a terminal, and a RAN device to resolve a problem of data transmission delay in a DRX mechanism in the prior art.

According to a first aspect, a data transmission method is used to transmit data in a DRX mechanism, where the method includes receiving, by a terminal in a DRX active period, first grant information sent by a RAN device, where the first grant information is used to perform initial transmission grant for first data. The method also includes receiving, by the terminal in a retransmission active time, second grant information sent by the RAN device, where the second grant information is used to perform initial transmission grant for second data, and the retransmission active time is an active time in which the terminal expects to receive a retransmission grant for the first data. The method further includes remaining, by the terminal, in an active state in an activation extension time that is after receiving of the second grant information.

With reference to the first aspect, in a first possible implementation manner of the first aspect, the first data is empty.

With reference to the first aspect or the first possible implementation manner of the first aspect, in a second possible implementation manner of the first aspect, the first grant information is used to perform uplink initial transmission grant for the first data, and the retransmission active time includes an uplink retransmission active time, where the uplink retransmission active time is an active time in which the terminal expects to receive an uplink retransmission grant for the first data.

With reference to the second possible implementation manner of the first aspect, in a third possible implementation manner of the first aspect, after the terminal receives the first grant information sent by the RAN device, and before the terminal receives the second grant information sent by the RAN device, the method further includes sending, by the terminal, the first data to the RAN device according to the first grant information. The method also includes further receiving, by the terminal in the uplink retransmission active time, feedback information sent by the RAN device, where the feedback information is used to feed back a status of receiving the first data by the RAN device, and the feedback information is an acknowledgement (ACK).

With reference to the first aspect or any one of the first to the third possible implementation manners of the first aspect, in a fourth possible implementation manner of the first aspect, the first grant information is used to perform downlink initial transmission grant for the first data, the retransmission active time includes a downlink retransmission active time, where the downlink retransmission active time is an active time in which the terminal expects to receive a downlink retransmission grant for the first data.

With reference to the fourth possible implementation manner of the first aspect, in a fifth possible implementation manner of the first aspect, after the terminal receives the first grant information sent by the RAN device, and before the terminal receives the second grant information sent by the RAN device, the method further includes receiving, by the terminal, the first data sent by the RAN device, and sending, by the terminal, feedback information to the RAN device, where the feedback information is used to feed back a status of receiving the first data by the terminal, and the feedback information is a negative acknowledgement (NACK).

With reference to the fourth or the fifth possible implementation manner of the first aspect, in a sixth possible implementation manner of the first aspect, the downlink retransmission active time is determined according to a DRX retransmission timer (also referred to as drx-Retransmission Timer).

With reference to the first aspect or any one of the first to the sixth possible implementation manners of the first aspect, in a seventh possible implementation manner of the first aspect, the activation extension time is determined according to a DRX inactivity timer (also referred to as drx-Inactivity Timer).

According to a second aspect, a data transmission method is provided, and is used to transmit data in a DRX mechanism, where the method includes sending, by a radio access network (RAN) device, first grant information to a terminal in a DRX active period, where the first grant information is used to perform initial transmission grant for first data. The method also includes determining, by the RAN device, a retransmission active time, where the retransmission active time is an active time in which the terminal expects to receive a retransmission grant for the first data. The method further includes sending, by the RAN device, second grant information to the terminal in the retransmission active time, where the second grant information is used to perform initial transmission grant for second data.

With reference to the second aspect, in a first possible implementation manner of the second aspect, sending, by the RAN device, the first grant information to the terminal includes one or any combination of the following. The method may include sending, by the RAN device, the first grant information to the terminal when having downlink data to send, where the first grant information is used to perform initial transmission grant for the to-be-sent downlink data. The method may also include sending, by the RAN device, the first grant information to the terminal when predicting that there is going to be downlink data to send, where the first data is empty, and the second data is the predicted to-be-sent downlink data. The method may further include sending, by the RAN device, the first grant information to the terminal when receiving a status report (SR) sent by the terminal, where the first grant information is used to perform initial transmission grant for to-be-sent uplink data. The method may also include sending, by the RAN device, the first grant information to the terminal when a buffer status report (BSR) that is of the terminal and maintained by the RAN device is non-empty, where the first grant information is used to perform initial transmission grant for to-be-sent uplink data in a buffer of the terminal. The method may further include sending, by the RAN device, the first grant information to the terminal when predicting that the terminal is going to have uplink data to send, where the first data is empty, and the second data is the predicted to-be-sent uplink data.

With reference to the second aspect or the first possible implementation manner of the second aspect, in a second possible implementation manner of the second aspect, the RAN device determines the retransmission active time according to a timing relationship.

With reference to the second aspect or either of the first and the second possible implementation manners of the second aspect, in a third possible implementation manner of the second aspect, the first grant information is used to perform uplink initial transmission grant for the first data, and the retransmission active time includes an uplink retransmission active time, where the uplink retransmission active time is an active time in which the terminal expects to receive an uplink retransmission grant for the first data.

With reference to the third possible implementation manner of the second aspect, in a fourth possible implementation manner of the second aspect, after the RAN device sends the first grant information, and before the RAN device sends the second grant information, the method further includes receiving the first data sent by the terminal according to the first grant information, and further sending, by the RAN device, feedback information in the uplink retransmission active time, where the feedback information is used to feed back a status of receiving the first data by the RAN device, and the feedback information is an ACK.

With reference to the second aspect or any one of the first to the fourth possible implementation manners of the second aspect, in a fifth possible implementation manner of the second aspect, the first grant information is used to perform downlink initial transmission grant for the first data, the retransmission active time includes a downlink retransmission active time, and the downlink retransmission active time is an active time in which the terminal expects to receive a downlink retransmission grant for the first data.

With reference to the fifth possible implementation manner of the second aspect, in a sixth possible implementation manner of the second aspect, before the RAN device sends the second grant information, the method further includes further sending, by the RAN device, the first data to the terminal in the downlink retransmission active time, and receiving, by the RAN device, feedback information sent by the terminal, where the feedback information is used to feed back a status of receiving the first data by the terminal, and the feedback information is a NACK.

With reference to the fifth or the sixth possible implementation manner of the second aspect, in a seventh possible implementation manner of the second aspect, the downlink retransmission active time is determined according to a DRX retransmission timer (also referred to as drx-Retransmission Timer).

With reference to the second aspect or any one of the first to the seventh possible implementation manners of the second aspect, in an eighth possible implementation manner of the second aspect, the activation extension time is determined according to a DRX inactivity timer (also referred to as drx-Inactivity Timer).

According to a third aspect, a terminal is provided, and is configured to transmit data in a DRX mechanism, where the terminal includes a communication unit, configured to receive, in a DRX active period, first grant information sent by a RAN device, where the first grant information is used to perform initial transmission grant for first data. The communication unit is further configured to receive, in a retransmission active time, second grant information sent by the RAN device, where the second grant information is used to perform initial transmission grant for second data. The retransmission active time is an active time in which the terminal expects to receive a retransmission grant for the first data. The terminal also includes a running unit, configured to remain in an active state in an activation extension time that is after receiving of the second grant information.

With reference to the third aspect, in a first possible implementation manner of the third aspect, the first data is empty.

With reference to the third aspect or the first possible implementation manner of the third aspect, in a second possible implementation manner of the third aspect, the first grant information is used to perform uplink initial transmission grant for the first data, and the retransmission active time includes an uplink retransmission active time, where the uplink retransmission active time is an active time in which the terminal expects to receive an uplink retransmission grant for the first data.

With reference to the second possible implementation manner of the third aspect, in a third possible implementation manner of the third aspect, the communication unit is further configured to, after receiving the first grant information sent by the RAN device, and before receiving the second grant information sent by the RAN device, send the first data to the RAN device according to the first grant information. The communication unit is also configured to receive, in the uplink retransmission active time, feedback information sent by the RAN device, where the feedback information is used to feed back a status of receiving the first data by the RAN device, and the feedback information is an ACK.

With reference to the third aspect or any one of the first to the third possible implementation manners of the third aspect, in a fourth possible implementation manner of the third aspect, the first grant information is used to perform downlink initial transmission grant for the first data, the retransmission active time includes a downlink retransmission active time, and the downlink retransmission active time is an active time in which the terminal expects to receive a downlink retransmission grant for the first data.

With reference to the fourth possible implementation manner of the third aspect, in a fifth possible implementation manner of the third aspect, the communication unit is further configured to, after receiving the first grant information sent by the RAN device, and before receiving the second grant information sent by the RAN device, receive the first data sent by the RAN device. The communication is also configured to send feedback information to the RAN device, where the feedback information is used to feed back a status of receiving the first data by the communication unit, and the feedback information is a NACK.

With reference to the fourth or the fifth possible implementation manner of the third aspect, in a sixth possible implementation manner of the third aspect, the downlink retransmission active time is determined according to a DRX retransmission timer (also referred to as drx-Retransmission Timer).

With reference to the third aspect or any one of the first to the sixth possible implementation manners of the third aspect, in a seventh possible implementation manner of the third aspect, the activation extension time is determined according to a DRX inactivity timer (also referred to as drx-Inactivity Timer).

According to a fourth aspect, a RAN device is provided, and is configured to transmit data in a DRX mechanism, where the RAN device includes a communication unit and a determining unit. The communication unit is configured to send first grant information to a terminal in a DRX active period, where the first grant information is used to perform initial transmission grant for first data. The determining unit is configured to determine a retransmission active time, where the retransmission active time is an active time in which the terminal expects to receive a retransmission grant for the first data. The communication unit is further configured to send second grant information to the terminal in the retransmission active time, where the second grant information is used to perform initial transmission grant for second data.

With reference to the fourth aspect, in a first possible implementation manner of the fourth aspect, the communication unit is configured to send the first grant information to the terminal when satisfying one or any combination of the following conditions. One condition is when the communication unit has downlink data to send, where the first grant information is used to perform initial transmission grant for the to-be-sent downlink data. Another condition is when the communication unit predicts that there is going to be downlink data to send, where the first data is empty, and the second data is the predicted to-be-sent downlink data. Another condition is when the communication unit receives an SR sent by the terminal, where the first grant information is used to perform initial transmission grant for to-be-sent uplink data. Still another condition is when a buffer status report (BSR) that is of the terminal and maintained by the communication unit is non-empty, where the first grant information is used to perform initial transmission grant for to-be-sent uplink data in a buffer of the terminal. Yet another condition is when the communication unit predicts that the terminal is going to have uplink data to send, where the first data is empty, and the second data is the predicted to-be-sent uplink data.

With reference to the fourth aspect or the first possible implementation manner of the fourth aspect, in a second possible implementation manner of the fourth aspect, the determining unit is configured to determine the retransmission active time according to a timing relationship.

With reference to the fourth aspect or either of the first and the second possible implementation manners of the fourth aspect, in a third possible implementation manner of the fourth aspect, the first grant information is used to perform uplink initial transmission grant for the first data, and the retransmission active time includes an uplink retransmission active time, where the uplink retransmission active time is an active time in which the terminal expects to receive an uplink retransmission grant for the first data.

With reference to the third possible implementation manner of the fourth aspect, in a fourth possible implementation manner of the fourth aspect, the communication unit is further configured to, after sending the first grant information, and before sending the second grant information, receive the first data sent by the terminal according to the first grant information. The communication unit is also configured to further send feedback information in the uplink retransmission active time, where the feedback information is used to feed back a status of receiving the first data by the communication unit, and the feedback information is an ACK.

With reference to the fourth aspect or any one of the first to the fourth possible implementation manners of the fourth aspect, in a fifth possible implementation manner of the fourth aspect, the first grant information is used to perform downlink initial transmission grant for the first data, the retransmission active time includes a downlink retransmission active time, and the downlink retransmission active time is an active time in which the terminal expects to receive a downlink retransmission grant for the first data.

With reference to the fifth possible implementation manner of the fourth aspect, in a sixth possible implementation manner of the fourth aspect, the communication unit is further configured to, before sending the second grant information, send the first data to the terminal in the downlink retransmission active time. The communication unit is also configured to receive feedback information sent by the terminal, where the feedback information is used to feed back a status of receiving the first data by the terminal, and the feedback information is a NACK.

With reference to the fifth or the sixth possible implementation manner of the fourth aspect, in a seventh possible implementation manner of the fourth aspect, the downlink retransmission active time is determined according to a DRX retransmission timer (also referred to as drx-Retransmission Timer).

With reference to the fourth aspect or any one of the first to the seventh possible implementation manners of the fourth aspect, in an eighth possible implementation manner of the fourth aspect, the activation extension time is determined according to a DRX inactivity timer (also referred to as drx-Inactivity Timer).

In embodiments of the present disclosure, a RAN device sends, to a terminal in a DRX active period, first grant information that is used to perform initial transmission grant for first data; and sends, to the terminal in a retransmission active time in which the terminal expects to receive a retransmission grant for the first data, second grant information that is used to perform initial transmission grant for second data; and the RAN device and the terminal remain in an active state in an activation extension time that is after the second grant information is sent. The initial transmission grant may be uplink initial transmission grant or downlink initial transmission grant. In this way, the RAN device may perform initial transmission by using an uplink retransmission active time or a downlink retransmission active time, so as to extend an active time, which not only ensures use of a DRX technology, but also reduces impact of a delay.

DETAILED DESCRIPTION OF ILLUSTRATIVE EMBODIMENTS

Figure 1:
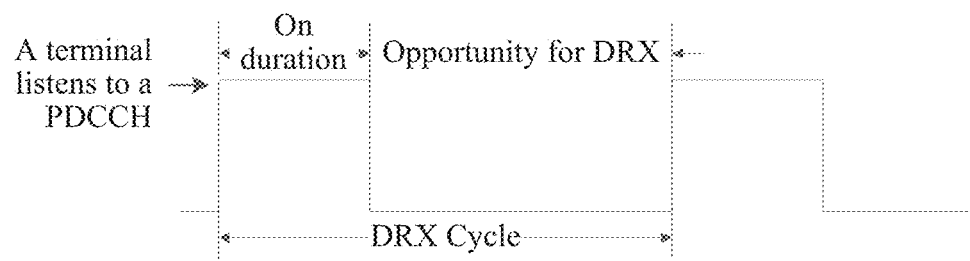
FIG. 1 is a schematic diagram of a DRX cycle provided in the prior art.

To make the objectives, technical solutions, and advantages of the present disclosure clearer, the following further describes the present disclosure in detail with reference to the accompanying drawings. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

The following explains some terms in this application.

A RAN device is a device that connects a terminal to a radio network, and includes but is not limited to: an evolved NodeB (eNB), a radio network controller (RNC), a NodeB (NB), a base station controller (BSC), a base transceiver station (BTS), a home base station (for example, a Home evolved NodeB, or a Home Node B, HNB), a baseband unit (BBU), a WiFi access point (AP), and the like.

A terminal, also referred to as user equipment (UE), is a device that provides a user with voice and/or data connectivity, for example, a hand-held device having a wireless connection function, a vehicle-mounted device having a wireless connection function, and another processing device connected to a wireless modem.

Initial transmission, also referred to as first-time transmission, refers to the first transmission of data.

"Multiple" refers to two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

In a DRX technology, a RAN device configures a DRX parameter for a terminal, so that the terminal and a base station maintain a same DRX cycle. For example, a DRX active period is configured by using an on duration timer (also referred to as onDuration Timer), that is, a quantity of PDCCH subframes that are consecutively listened to, counting from the beginning of one DRX cycle. In addition to the active period, several other active times may be further configured. For example, an activation extension time is configured by using a DRX inactivity timer (also referred to as drx-Inactivity Timer). The activation extension time specifies a time in which a terminal is in an active state after initial transmission, that is, a quantity of consecutive PDCCH subframes during which the terminal continuously remains in an active state after successfully decoding a PDCCH that indicates initial transmission of uplink (UL), downlink (DL), or sidelink (SL) user data. For another example, an active time in which a terminal expects to receive a downlink retransmission grant is configured by using a DRX retransmission timer (also referred to as drx-Retransmission Timer), that is, a quantity of PDCCH subframes that are consecutively listened to starting from a subframe at which the terminal expects to receive the downlink retransmission grant, that is, after a round trip time of a hybrid automatic repeat request (HARQ RTT). For still another example, a terminal is configured to be in an active state in an uplink grant time of HARQ retransmission that is to occur when an HARQ buffer has data. Limitation that an uplink grant actually occurs is not imposed herein, but the terminal maintains and listens to a PDCCH according to the uplink grant time to expect to receive the uplink grant. There are still other active times, which are not discussed herein.

An active time configured by the foregoing drx-Retransmission Timer is generally multiple transmit time intervals (TTIs), and the time is used for receiving a downlink retransmission grant, that is, a terminal listens to a PDCCH to expect to receive a downlink retransmission grant. An uplink grant moment, of HARQ retransmission that is to occur, is generally one TTI, and the time is used for receiving an uplink retransmission grant, that is, a terminal listens to a PDCCH to expect to receive an uplink retransmission grant, without being limited to actual reception of the uplink retransmission grant. In the embodiments of the present disclosure, the two kinds of active times related to retransmission are referred to as retransmission active times, and they are respectively referred to as a downlink retransmission active time and an uplink retransmission active time.

Rather than a retransmission active time being used only for downlink retransmission grant or uplink retransmission grant, in embodiments of the present disclosure, impact of a delay on a service, and in particular, impact on a voice service, in a DRX mechanism are taken into consideration. Initial transmission is performed by using the foregoing retransmission active time, so that after the initial transmission, an active time is extended by at least one activation extension time, that is, extended by duration specified by at least one drx-Inactivity Timer. In this way, use of a DRX technology is ensured, and the impact of the delay is reduced. In particular, when an active period configured in a DRX parameter is relatively short, voice performance is improved, and power saving performance of a terminal is ensured by using the DRX technology, which improves user experience.

The following describes the embodiments of the present disclosure in detail with reference to the accompanying drawings.

Figure 2:
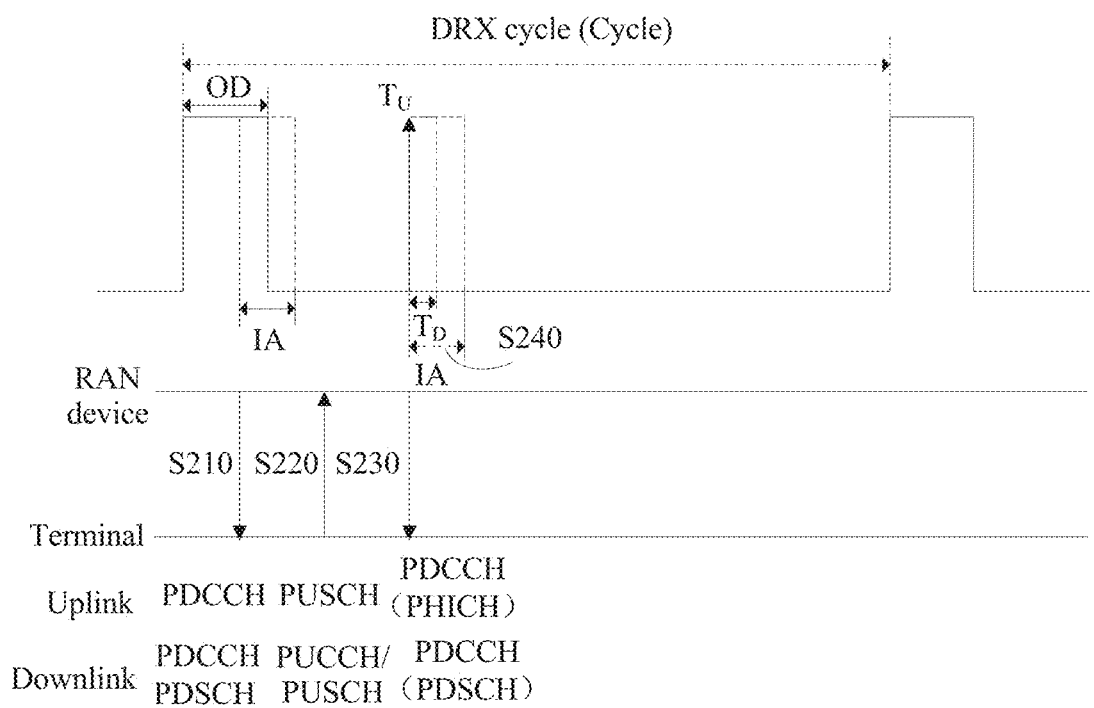
FIG. 2 is a schematic diagram of a data transmission method according to an embodiment of the present disclosure.

Referring to FIG. 2, FIG. 2 is a schematic diagram of a data transmission method according to an embodiment of the present disclosure. The method is used to transmit data in a DRX mechanism. As shown in FIG. 2, the method includes the following steps.

S210. A RAN device performs initial transmission grant in a DRX active period OD. The initial transmission grant may be uplink initial transmission grant or downlink initial transmission grant.

For example, in an uplink direction, when having data that needs to be sent, a terminal sends a scheduling request (SR) to the RAN device, and the RAN device performs uplink scheduling grant according to the SR, that is, sends an uplink grant to the terminal by using a PDCCH. The terminal obtains the uplink grant by listening to the PDCCH channel, and performs uplink initial transmission based on the uplink grant (S220). For another example, in a downlink direction, the RAN device sends a downlink grant to the terminal by using a PDCCH, to instruct the terminal to receive data on a physical downlink shared channel (PDSCH); and sends the data to the terminal by using the PDSCH, that is, performs downlink initial transmission. After receiving initially transmitted data sent by the RAN device, the terminal feeds back a status of receiving the initially transmitted data (S220). If the terminal successfully receives the initially transmitted data, the terminal returns an ACK, and otherwise returns a NACK.

It should be noted that the foregoing step S220, that is, the uplink initial transmission or downlink feedback of the terminal, may be completed in the active period OD, may be completed in an activation extension time (IA), or may be completed in a sleep period, which is not limited herein.

In the uplink direction, after receiving uplink initially transmitted data of the terminal, the RAN device feeds back a status of receiving the initially transmitted data. The RAN device feeds back an ACK in a case of correct receiving, and may not perform uplink retransmission grant. The RAN device feeds back an NACK in a case of incorrect receiving, and may or may not perform uplink retransmission grant. The uplink retransmission grant is performed by using the PDCCH, and the feedback is performed by using a physical hybrid automatic repeat request indicator channel (PHICH). For the terminal, the terminal cannot foresee the reception status of the initially transmitted data, and therefore, in this case the terminal needs to maintain one active time to receive a possible uplink retransmission grant, so as to perform retransmission by using the uplink retransmission grant in a case of a transmission failure of the uplink initially transmitted data. It can be learned that the active time is an uplink retransmission active time $T_U$, and because the active time is generally one TTI, the active time may also be referred to as an uplink retransmission activation moment, and is used to receive only the uplink retransmission grant.

In the downlink direction, after the terminal sends feedback information to the RAN device, if the feedback information is a NACK, the terminal starts a DRX retransmission timer (also referred to as drx-Retransmission Timer) after an HARQ RTT to listen to the PDCCH, so as to expect to receive a downlink retransmission grant, and receives, based on the downlink retransmission grant, downlink retransmission data on the PDSCH. Duration of the DRX retransmission timer is a downlink retransmission active time $T_D$, and is used to receive only the downlink retransmission grant.

In this embodiment of the present disclosure, initial transmission is performed by using one or both of the uplink retransmission active time $T_U$ and the downlink retransmission active time $T_D$, and in this way, the active time may be extended by at least one activation extension time IA. That is, the foregoing method further includes the following steps.

S230. The RAN device performs initial transmission grant in the retransmission active time, where the initial transmission grant may be uplink initial transmission grant or may be downlink initial transmission grant. Since the grant is the initial transmission grant, it is not used to retransmit the data for which the previous initial transmission grant is performed, that is, data for which this initial transmission grant is performed is different from the data for which the initial transmission grant is performed in the foregoing step S210. Therefore, for the sake of distinction, the initial transmission grant in step S210 is referred to as first initial transmission grant, and the initial transmission grant in step S230 is referred to as second initial transmission grant.

In this way, in the uplink direction, the RAN device sends an uplink grant to the terminal in the uplink retransmission active time $T_U$ by using the PDCCH. Certainly, a feedback on the PHICH may be performed or may not be performed, which is not limited herein. That is, whether PHICH transmission in the parentheses in the figure is performed is not limited in this application. In the downlink direction, the RAN device sends a downlink grant to the terminal in the downlink retransmission active time $T_D$ by using the PDCCH. Whether downlink initially transmitted data on the PDSCH is actually sent is not limited herein, that is, transmission of data, for the terminal, on the PDSCH in the parentheses in the figure may be empty.

S240. Because the terminal receives an initial transmission grant in the retransmission active time, the terminal may start a DRX inactivity timer (also referred to as drx-Inactivity Timer) so that an active time is extended by one activation extension time IA. If initial transmission occurs again within the activation extension time IA, the DRX inactivity timer is restarted, and the active time continues to be extended.

A scheduling grant from the RAN device for the terminal includes an uplink scheduling grant and a downlink scheduling grant, and may be implemented by using downlink control information (DCI) of the PDCCH. The DCI carries uplink/downlink scheduling information, a modulation and coding scheme, HARQ information, power control information, and the like, and is carried and transmitted by the PDCCH channel. The DCI is mainly classified into three categories: firstly, downlink scheduling allocation, including a PDSCH resource indication, a transmission format, HARQ information, spatial multiplexing information, and the like; secondly, an uplink scheduling grant, including a PUSCH resource indication, a transmission format, HARQ information, and the like; and thirdly, a PUSCH power control command, which is a PUSCH power control command corresponding to a group of terminals, used as supplement of a PUSCH power control command in an uplink grant. Because these are well known to persons skilled in the art, and are unrelated to the essence of the present disclosure, details are not described herein again.

The following describes the embodiments of the present disclosure in detail with reference to the flowcharts.

Figure 3:
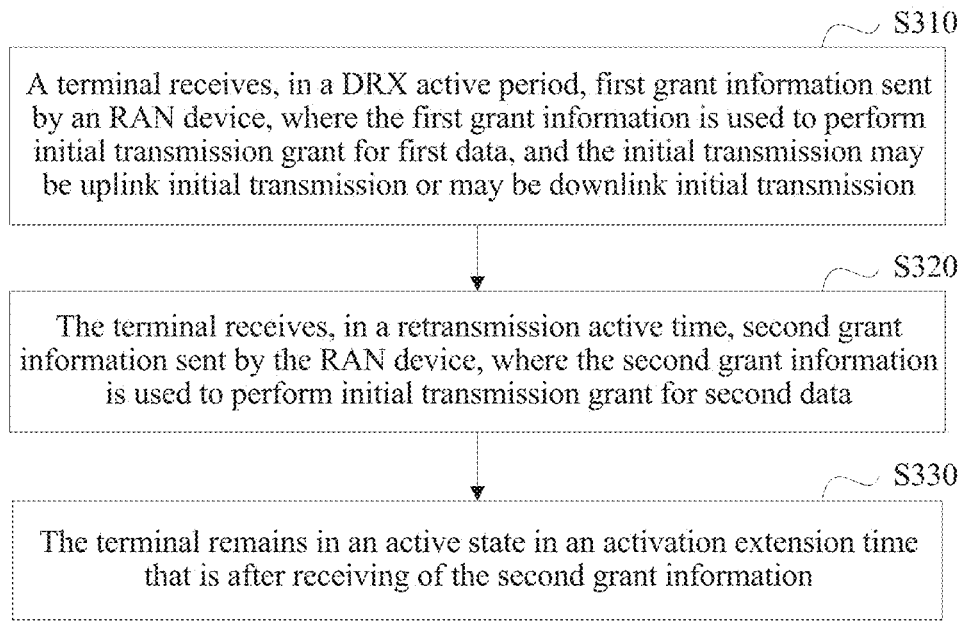
FIG. 3 is a schematic flowchart of a data transmission method according to an embodiment of the present disclosure.

Referring to FIG. 3, FIG. 3 is a schematic flowchart of a data transmission method according to an embodiment of the present disclosure. The method is used to transmit data in a DRX mechanism. As shown in FIG. 3, the method is executed by a terminal, and includes the following steps.

S310. A terminal receives, in a DRX active period, first grant information sent by a RAN device, where the first grant information is used to perform initial transmission grant for first data, and the initial transmission may be uplink initial transmission or may be downlink initial transmission.

In S310, if the first data is uplink data that the terminal needs to send to the RAN device, the first grant information is an uplink initial transmission grant. If the first data is downlink data that the RAN device needs to send to the terminal, the first grant information is a downlink initial transmission grant.

When the first data is uplink data, optionally, the first data may be generated and have not been initially transmitted by the terminal. The terminal sends an SR to the RAN device after generating the first data, so that the RAN device sends the first grant information to the terminal according to the SR. Optionally, when the terminal generates a data packet of which a data volume is relatively large and has performed initial transmission of a part of data in the data packet, the first data may be other data remaining in the data packet. When determining that the data packet has the other remaining data, the terminal sends a buffer status report (BSR) to the RAN device, so that the RAN device sends the first grant information to the terminal according to the BSR. Optionally, when predicting that the terminal is going to have uplink data to send, the RAN device delivers the first grant information. If the terminal has not generated the to-be-sent uplink data, the first data sent to the RAN device is empty. When predicting that the terminal is going to have to-be-sent uplink data, the RAN device sends the first grant information so that the terminal and the RAN device are in an active state in an activation extension time IA that is after the first grant information is sent, which avoids that a transmission delay increases because the terminal and the RAN device are in a sleep state when the terminal generates the to-be-sent uplink data. In addition, a subsequent retransmission active time and an activation extension time triggered by the retransmission active time may also be triggered, and the to-be-sent uplink data may be transmitted in any active time of the active times.

When the first data is downlink data, optionally, the first data is generated and has not been initially transmitted, by the RAN device. Then, when sending the first grant information, the RAN further sends the first data by using a PDSCH. Optionally, when predicting that there is going to be downlink data to send, the RAN device sends the first grant information to the terminal, but at this moment, the downlink data has not been generated or has not arrived. Then, when sending the first grant information, the RAN device sends the first data that is empty by using the PDSCH. When predicting to-be-sent downlink data, the RAN device sends the first grant information. Similarly, the terminal and the RAN device may also be made to be in an active state in an activation extension time IA that is after the first grant information is sent, which avoids that a transmission delay increases because the terminal and the RAN device are in a sleep state when the RAN device generates the to-be-sent downlink data. In addition, a subsequent retransmission active time and an activation extension time triggered by the retransmission active time may also be triggered, and the to-be-sent downlink data may be transmitted in any active time of the active times.

S320. The terminal receives, in a retransmission active time, second grant information sent by the RAN device, where the second grant information is used to perform initial transmission grant for second data.

The first grant information in S310 is used to perform uplink initial transmission grant for the first data, and then the retransmission active time includes an uplink retransmission active time, where the uplink retransmission active time is an active time in which the terminal expects to receive an uplink retransmission grant for the first data. In addition, after S310, and before S320, the method further includes sending, by the terminal, the first data to the RAN device according to the first grant information, further receiving, by the terminal in the uplink retransmission active time, feedback information sent by the RAN device, where the feedback information is used to feed back a status of receiving the first data by the RAN device, and the feedback information is an ACK.

In this way, in a process of uplink data transmission, the RAN device and the terminal may perform initial transmission by using the uplink retransmission active time, so as to extend the active time.

The first grant information in S310 may be used to perform downlink initial transmission grant for the first data, and then the retransmission active time includes a downlink retransmission active time, where the downlink retransmission active time is an active time in which the terminal expects to receive a downlink retransmission grant for the first data. In addition, after S310, and before S320, the method further includes receiving, by the terminal, the first data sent by the RAN device, and sending, by the terminal, feedback information to the RAN device, where the feedback information is used to feed back a status of receiving the first data by the terminal, and the feedback information is a NACK.

In this way, in a process of downlink data transmission, the RAN device and the terminal may also perform initial transmission by using the downlink retransmission active time, so as to extend the active time.

The downlink retransmission active time is determined according to a DRX retransmission timer (also referred to as drx-Retransmission Timer).

S330. The terminal remains in an active state in an activation extension time that is after receiving of the second grant information.

The activation extension time is determined according to a DRX inactivity timer (also referred to as drx-Inactivity Timer).

The foregoing retransmission active time is an active time in which the terminal expects to receive a retransmission grant for the first data. Here, expecting to receive a retransmission grant means that a retransmission grant for the first data may not be sent in this time, but because there may be a retransmission grant for the first data, the terminal maintains the active time to expect to receive the retransmission grant. In addition, the retransmission active time may include the uplink retransmission active time, or may include the downlink retransmission active time, or includes both the uplink retransmission active time and the downlink retransmission active time. The uplink retransmission active time is an active time in which the terminal expects to receive the uplink retransmission grant for the first data, and the foregoing downlink retransmission active time is an active time in which the terminal expects to receive the downlink retransmission grant for the first data. That is, the uplink retransmission active time may be used to perform initial transmission to extend the active time, the downlink retransmission active time may be used to perform initial transmission to extend the active time, or both of them are used to extend the active time.

The uplink retransmission active time may be one TTI, which is not limited in this application, or it may be set to another value. The downlink retransmission active time may be determined according to the DRX retransmission timer (also referred to as drx-Retransmission Timer), and generally may be multiple TTIs. Certainly, the downlink retransmission active time may also be determined in another manner, which is not limited in this application. In addition, the activation extension time may be determined according to the DRX inactivity timer (also referred to as drx-Inactivity Timer). Certainly, the activation extension time may also be determined in another manner, which is not limited in this application.

Figure 4:
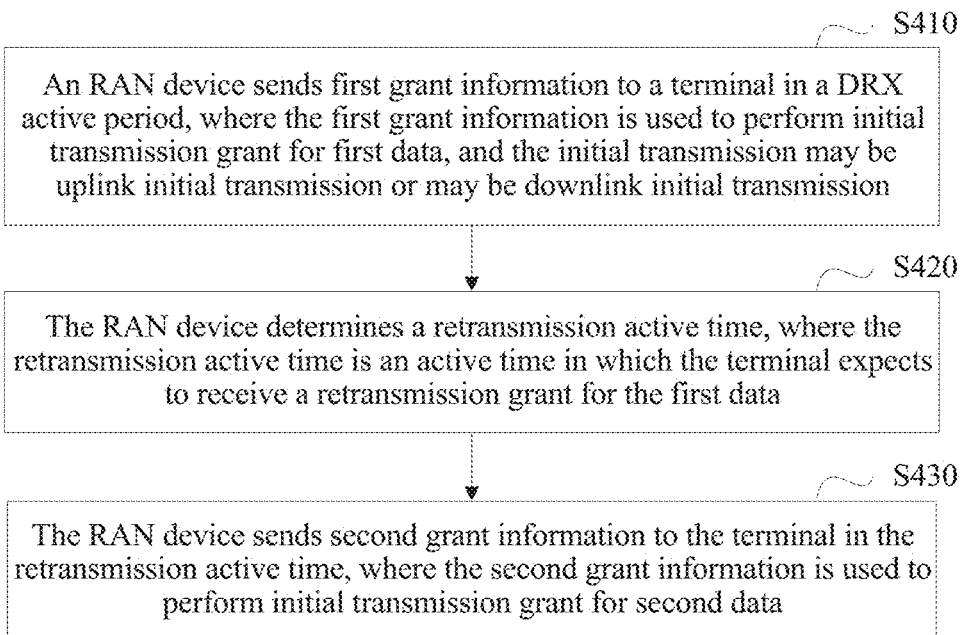
FIG. 4 is a schematic flowchart of a data transmission method according to an embodiment of the present disclosure.

Referring now to FIG. 4, FIG. 4 is a schematic flowchart of a data transmission method according to an embodiment of the present disclosure. The method is used to transmit data in a DRX mechanism. As shown in FIG. 4, the method is executed by a RAN device, and includes the following steps.

S410. A RAN device sends first grant information to a terminal in a DRX active period, where the first grant information is used to perform initial transmission grant for first data, and the initial transmission may be uplink initial transmission or may be downlink initial transmission.

S420. The RAN device determines a retransmission active time, where the retransmission active time is an active time in which the terminal expects to receive a retransmission grant for the first data.

When the first grant information is used to perform uplink initial transmission grant for the first data, optionally, the retransmission active time includes an uplink retransmission active time, where the uplink retransmission active time is an active time in which the terminal expects to receive an uplink retransmission grant for the first data, Optionally, after the RAN device sends the first grant information, and before the RAN device sends the second grant information, the method further includes receiving the first data sent by the terminal according to the first grant information, and further sending, by the RAN device, feedback information in the uplink retransmission active time, where the feedback information is used to feed back a status of receiving the first data by the RAN device, and the feedback information is an ACK.

When the first grant information is used to perform downlink initial transmission grant for the first data, optionally, the retransmission active time includes a downlink retransmission active time, where the downlink retransmission active time is an active time in which the terminal expects to receive a downlink retransmission grant for the first data. Optionally, before the RAN device sends the second grant information, the method further includes further sending, by the RAN device, the first data to the terminal in the downlink retransmission active time, and receiving, by the RAN device, feedback information sent by the terminal, where the feedback information is used to feed back a status of receiving the first data by the terminal, and the feedback information is a NACK.

Optionally, the downlink retransmission active time is determined according to a DRX retransmission timer (also referred to as drx-Retransmission Timer).

S430. The RAN device sends second grant information to the terminal in the retransmission active time, where the second grant information is used to perform initial transmission grant for second data.

The activation extension time is determined according to a DRX inactivity timer (also referred to as drx-Inactivity Timer).

The foregoing step S410 may be triggered in any one or combination of the following several manners.

First, when the RAN device has downlink data to send, the RAN device may be triggered to send the first grant information to the terminal, and in this case, the first grant information is used to perform initial transmission grant for the to-be-sent downlink data.

Second, when the RAN device predicts that there is going to be downlink data to send, the RAN device may be triggered to send the first grant information to the terminal, and in this case, the first grant information is used for empty initial transmission scheduling, that is, data sent to the terminal on a PDSCH is empty. However, the RAN device may perform grant for the downlink data in an activation extension time that is after the first grant information is decoded or in a downlink retransmission active time, and send the downlink data to the terminal. In this case, the first data is empty, and the to-be-sent downlink data may be delivered in the activation extension time that is after the first grant information is decoded, or may be delivered in the downlink retransmission active time. In this case, the second data may be the predicted to-be-sent downlink data. This case is particularly applicable to a voice service, because the voice service has a particular regularity and is easy to predict in advance.

Third, the terminal sends an SR to the RAN device when having uplink data to send, and when the RAN device receives the SR sent by the terminal, the RAN device may be triggered to send the first grant information to the terminal. In this case, the first grant information is used to perform initial transmission grant for the to-be-sent uplink data.

Fourth, when a BSR that is of the terminal and maintained by the RAN device is non-empty, the RAN device may be triggered to send the first grant information to the terminal. In this case, the first grant information is used to perform initial transmission grant for to-be-sent uplink data in a buffer of the terminal.

Fifth, when the RAN device predicts that the terminal is going to have uplink data to send, the RAN device may be triggered to send the first grant information to the terminal, and in this case, the first grant information is used for empty initial transmission scheduling. However, the RAN device may perform grant for the uplink data in an activation extension time that is after the first grant information is decoded or in an uplink retransmission active time, so that the terminal sends the uplink data by using the grant. In this case, the first data is empty, and grant information of the to-be-sent uplink data may be delivered in the activation extension time that is after the first grant information is decoded, or may be delivered in the uplink retransmission active time. In this case, the second data may be the predicted to-be-sent uplink data. This case is particularly applicable to a voice service, because the voice service has a particular regularity and is easy to predict in advance.

In the foregoing step S420, the RAN device may determine the retransmission active time according to a timing relationship. For example, in a frequency division duplex (FDD) communications system, it is assumed that a time in which the RAN device sends the first grant information is T1, and the retransmission active time is T1+8TTI according to a timing relationship in the FDD communications system. In a time division duplex (TDD) communications system, a corresponding timing relationship may be selected according to a selected uplink-downlink subframe configuration, to determine the retransmission active time. For example, the retransmission active time may be determined by referring to timing relationships corresponding to different uplink-downlink subframe configurations specified in the 3$^{rd}$ Generation Partnership Project (3GPP) Protocol TS 36.213.

A description of the retransmission active time is the same as that in the foregoing embodiments, and is not given herein again.

It should be noted that in the foregoing embodiments, when the first data is not empty, in an uplink transmission direction, when the RAN device successfully receives the first data sent by the terminal, the RAN device may feed back an ACK to the terminal, and send the second grant information to the terminal on the PDCCH, where the second grant information is used for another initial transmission grant, that is, used to perform initial transmission grant for the second data. In this case, because the first data is correctly received, and does not need to be retransmitted, using the uplink retransmission active time to perform initial transmission may be compatible with an existing protocol, and does not affect retransmission. Certainly, initial transmission may also be performed when the RAN device feeds back a NACK, which is not limited in this application. When the first data is not empty, in a downlink transmission direction, when not successfully receiving the first data sent by the RAN device, the terminal feeds back a NACK to the RAN device. In this case, the terminal remains in an active state in the retransmission active time to expect to receive retransmission of the first data, and the RAN device performs downlink initial transmission grant by using the active time, which may not change an existing protocol. Certainly, the terminal may also trigger starting of the downlink retransmission active time when feeding back the ACK, so as to facilitate initial transmission performed by using the downlink retransmission active time, which is not limited in this application.

The following provides descriptions separately from two perspectives of an uplink and a downlink.

Figure 5:
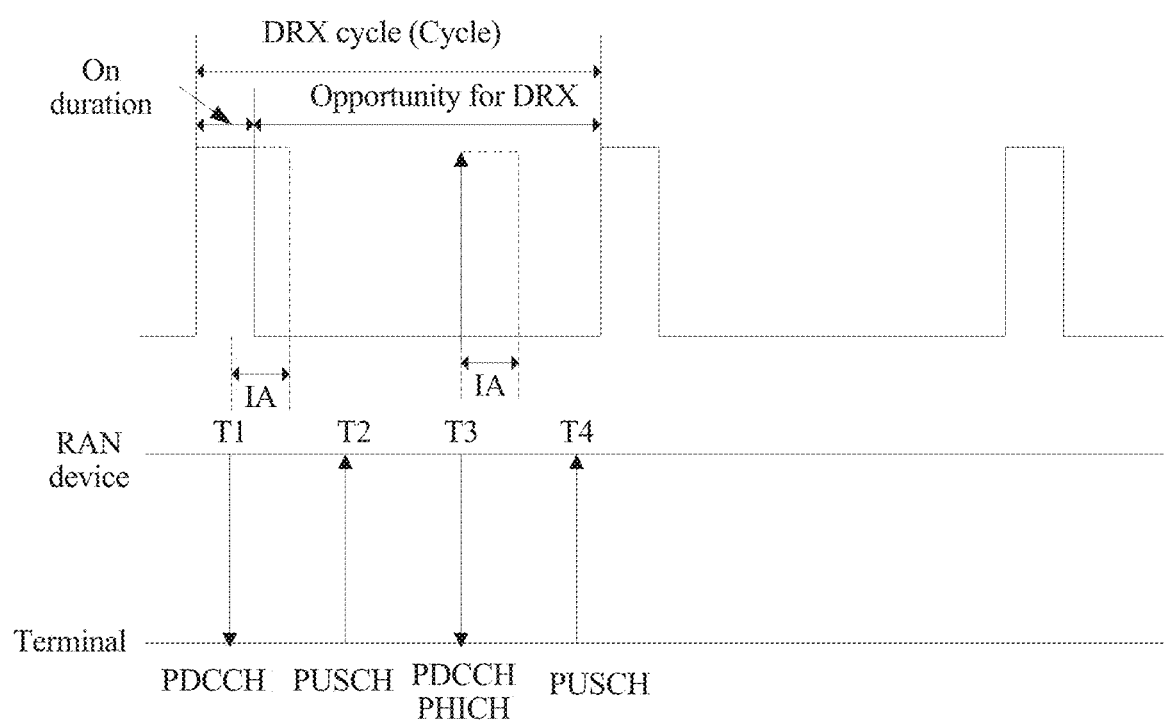
FIG. 5 is an example diagram of uplink data transmission according to an embodiment of the present disclosure.

Referring to FIG. 5, FIG. 5 is an example diagram of uplink data transmission, and a procedure of performing initial data transmission by using an uplink retransmission active time includes the following.

A1. After generating a to-be-transmitted data packet, a terminal sends an SR to a RAN device.

B1. The RAN device sends first grant information to the terminal at a moment T1 in an active period of one DRX cycle by using a PDCCH, where the first grant information is used to perform initial transmission grant for the to-be-transmitted data packet. In addition, the RAN device may determine a grant time for retransmission when the to-be-transmitted data is not correctly received, that is, an uplink retransmission active time.

C1. The terminal listens to the PDCCH in the active period, and obtains the first grant information by means of listening. Because a data volume of the to-be-transmitted data packet is relatively large, the terminal initially transmits first data in the to-be-transmitted data packet to the RAN device at a moment T2 by using a PUSCH. Because the to-be-transmitted data packet further includes second data that is stored in a buffer of the terminal, the terminal further sends a BSR to the RAN device when sending the first data.

D1. After receiving the first data at the moment T2, the RAN device performs decoding, and generates feedback information ACK when the decoding succeeds.

E1. The RAN device sends the feedback information to the terminal at a moment T3, that is, the uplink retransmission active time, by using a PHICH, and sends second grant information to the terminal by using the PDCCH at the same time, where the second grant information is used to perform initial transmission grant for the second data.

F1. The terminal listens to the PDCCH and obtains, at the moment T3, the second grant information by means of listening, and when a moment T4 arrives, performs initial transmission of the second data to the RAN device by using the PUSCH.

When a terminal is scheduled at a subframe to perform initial data transmission (that is, the terminal receives uplink grant information or downlink grant information that is used for initial data transmission), the terminal and a RAN device configure an activation extension time by using a drx-Inactivity Timer, where the drx-Inactivity Timer is IA in the figure. As shown in the figure, in this way, an active time of the terminal and the RAN device in one DRX cycle may be extended.

In B1, that the RAN device determines the uplink retransmission active time T3 specifically includes that the RAN device uses, as the uplink retransmission active time T3, the moment T3 that arrives after a first set quantity of transmission time intervals (TTIs) following the moment T1 at which the first grant information is sent.

The value of the first set quantity varies in different duplex systems. For example, in an FDD system, among T1, T2, T3, and T4, there are four TTIs between two neighboring moments. Therefore, a value of the first set quantity is 8. For another example, in a TDD system, the first set quantity needs to be determined according to timing relationships of different uplink-downlink subframe configurations.

Figure 6:
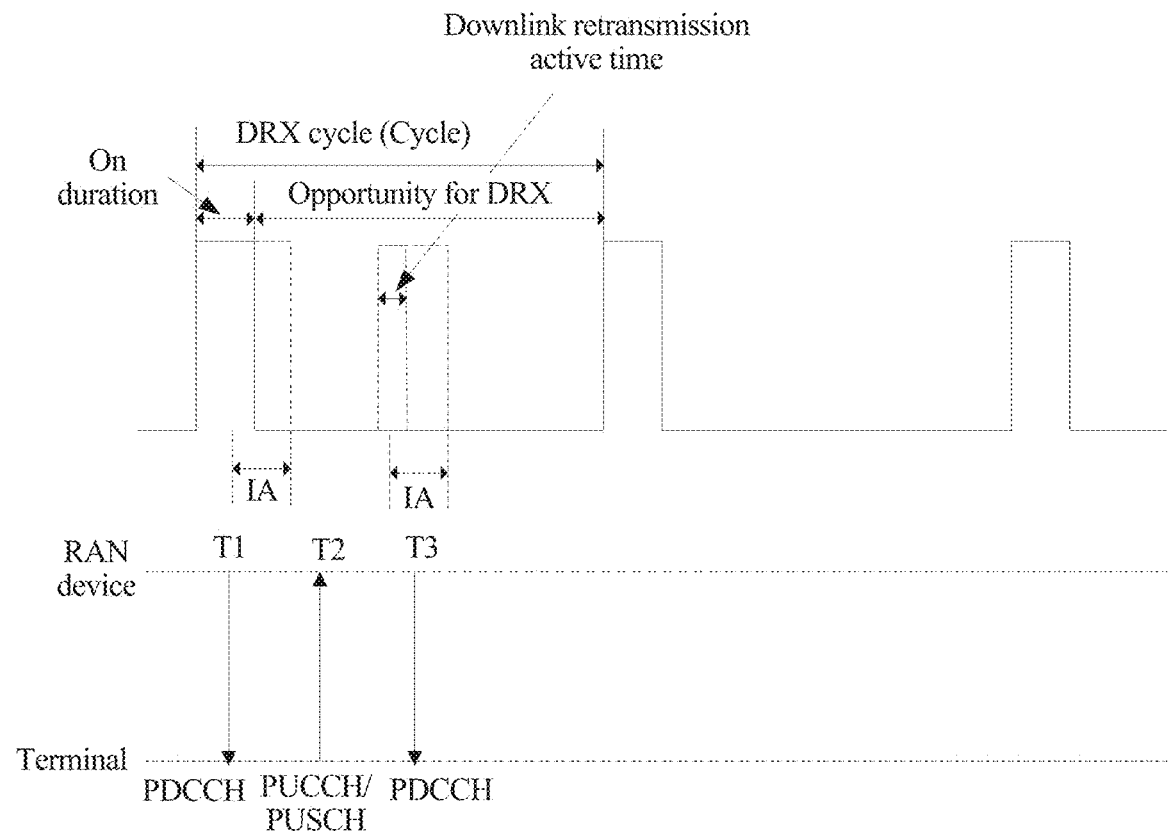
FIG. 6 is an example diagram of downlink data transmission according to an embodiment of the present disclosure.

Referring to FIG. 6, FIG. 6 is an example diagram of downlink data transmission, and a procedure of performing initial data transmission by using a downlink data retransmission active time includes the following.

A2. When determining that there is downlink data to send, a RAN device sends first grant information to a terminal at a moment T1 in an active period of one DRX cycle by using a PDCCH, where the first grant information is used for initial transmission grant for first data in the downlink data, and the RAN device sends the first data by using a PDSCH at the same time.

B2. The terminal obtains, at the moment T1 and by means of listening, the first grant information sent by using the PDCCH, starts a set time window (such as an HARQ RTT Timer), and receives the first data according to the first grant information.

C2. The terminal performs decoding on the first data after the moment T1, and generates feedback information NACK when the decoding fails, the terminal sends the feedback information to the RAN device at a moment T2 by using a physical uplink control channel (PUCCH) or a physical uplink shared channel (PUSCH), and the terminal starts a DRX retransmission timer (also referred to as drx-Retransmission Timer) after an HARQ RTT to expect to receive the first data retransmitted by the RAN device. An operating period of the DRX retransmission timer is a downlink retransmission active time.

D2. The RAN device may send second grant information to the terminal at any moment in the downlink retransmission active time, where the second grant information is used to perform initial transmission grant for the second data; and the RAN device sends the second data by using a PDSCH at the same time.

The length of the HARQ RTT Timer varies in different duplex systems. For example, a length of the set time window is a length of eight subframes in an FDD system, and may be determined in a TDD system according to a timing relationship corresponding to a selected uplink-downlink subframe configuration.

In this embodiment of the present disclosure, the RAN device may deliver, to the terminal by using the downlink retransmission active time of the first data and by using the PDCCH, the second grant information that is used to perform initial transmission of the second data, to implement initial data transmission by using the downlink retransmission active time.

In this embodiment of the present disclosure, as shown in the figure, every time the terminal receives downlink grant information that is used for initial data transmission, the terminal maintains one activation extension time by using the drx-Inactivity Timer, so as to extend an active time in the DRX cycle.

Figure 7:
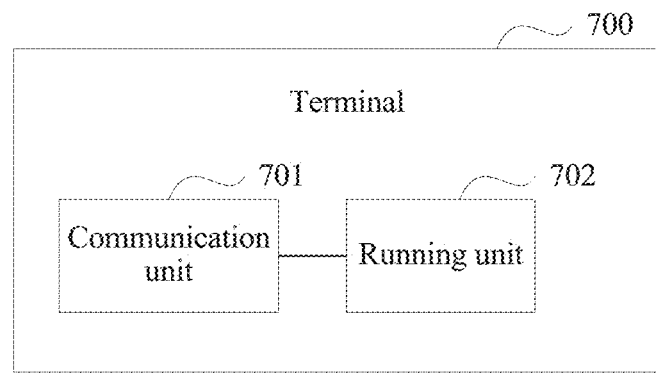
FIG. 7 is a schematic structural diagram of a terminal according to an embodiment of the present disclosure.

Based on the foregoing embodiments, an embodiment of the present disclosure further provides a terminal that is configured to transmit data in a DRX mechanism. Referring now to FIG. 7, a terminal 700 includes a communication unit 701 and a running unit 702, where the communication unit 701 is configured to receive, in a DRX active period, first grant information sent by a radio access network (RAN) device, where the first grant information is used to perform initial transmission grant for first data. The communication unit 701 is further configured to receive, in a retransmission active time, second grant information sent by the RAN device, where the second grant information is used to perform initial transmission grant for second data, and the retransmission active time is an active time in which the terminal expects to receive a retransmission grant for the first data. The running unit 702 is configured to remain in an active state in an activation extension time that is after receiving of the second grant information.

It should be noted that descriptions of the retransmission active time, the first data, and the second data are the same as those in the foregoing method embodiments.

Optionally, the first data is empty.

Optionally, the first grant information is used to perform uplink initial transmission grant for the first data, and the retransmission active time includes an uplink retransmission active time, where the uplink retransmission active time is an active time in which the terminal expects to receive an uplink retransmission grant for the first data.

Optionally, the communication unit 701 is further configured to, after receiving the first grant information sent by the RAN device, and before receiving the second grant information sent by the RAN device, send the first data to the RAN device according to the first grant information, and receive, in the uplink retransmission active time, feedback information sent by the RAN device, where the feedback information is used to feed back a status of receiving the first data by the RAN device, and the feedback information is an ACK.

Optionally, the first grant information is used to perform downlink initial transmission grant for the first data, the retransmission active time includes a downlink retransmission active time, and the downlink retransmission active time is an active time in which the terminal expects to receive a downlink retransmission grant for the first data.

Optionally, the communication unit 701 is further configured to, after receiving the first grant information sent by the RAN device, and before receiving the second grant information sent by the RAN device, receive the first data sent by the RAN device, and send feedback information to the RAN device, where the feedback information is used to feed back a status of receiving the first data by the terminal, and the feedback information is a NACK.

Optionally, the downlink retransmission active time is determined according to a DRX retransmission timer (also referred to as drx-Retransmission Timer).

Optionally, the activation extension time is determined according to a DRX inactivity timer (also referred to as drx-Inactivity Timer).

It should be noted that the communication unit in this embodiment may be implemented by a transceiver apparatus of the terminal. The running unit may be a processor that is separately disposed, may be integrated into a processor of the terminal for implementation, or may be stored in a memory of the terminal in a form of program code, which is invoked by a processor of the terminal to perform the function of the foregoing running unit. The processor described herein may be a central processing unit (CPU), or an application-specific integrated circuit (ASIC), or one or more integrated circuits configured to implement this embodiment of the present disclosure.

Figure 8:
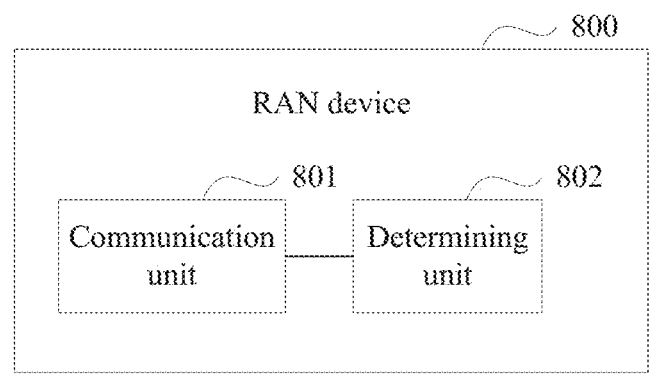
FIG. 8 is a schematic structural diagram of a RAN device according to an embodiment of the present disclosure.

Based on the foregoing embodiments, an embodiment of the present disclosure further provides a RAN device that is configured to transmit data in a DRX mechanism. Referring now to FIG. 8, a RAN device 800 includes a communication unit 801 and a determining unit 802. The communication unit 801 is configured to send first grant information to a terminal in a DRX active period, where the first grant information is used to perform initial transmission grant for first data. The determining unit 802 is configured to determine a retransmission active time, where the retransmission active time is an active time in which the terminal expects to receive a retransmission grant for the first data. The communication unit 801 is further configured to send second grant information to the terminal in the retransmission active time, where the second grant information is used to perform initial transmission grant for second data.

It should be noted that descriptions of the retransmission active time, the first data, and the second data are the same as those in the foregoing method embodiments.

Optionally, the communication unit 801 is configured to send the first grant information to the terminal when satisfying one or any combination of the following conditions. One condition is when the communication unit 801 has downlink data to send, where the first grant information is used to perform initial transmission grant for the to-be-sent downlink data. Another condition is when the communication unit 801 predicts that there is going to be downlink data to send, where the first data is empty, and the second data is the predicted to-be-sent downlink data. Yet another condition is when the communication unit 801 receives an SR sent by the terminal, where the first grant information is used to perform initial transmission grant on to-be-sent uplink data. Still another condition is when a BSR that is of the terminal and maintained by the communication unit 801 is non-empty, where the first grant information is used to perform initial transmission grant for to-be-sent uplink data in a buffer of the terminal. Another condition is when the communication unit 801 predicts that the terminal is going to have uplink data to send, where the first data is empty, and the second data is the predicted to-be-sent uplink data.

Optionally, the determining unit 802 is configured to determine the retransmission active time according to a timing relationship.

Optionally, the first grant information is used to perform uplink initial transmission grant for the first data, and the retransmission active time includes an uplink retransmission active time, where the uplink retransmission active time is an active time in which the terminal expects to receive an uplink retransmission grant for the first data.

Optionally, the communication unit 801 is further configured to, after sending the first grant information, and before sending the second grant information, receive the first data sent by the terminal according to the first grant information, and further send feedback information in the uplink retransmission active time, where the feedback information is used to feed back a status of receiving the first data by the RAN device, and the feedback information is an ACK.

Optionally, the first grant information is used to perform downlink initial transmission grant for the first data, the retransmission active time includes a downlink retransmission active time, and the downlink retransmission active time is an active time in which the terminal expects to receive a downlink retransmission grant for the first data.

Optionally, the communication unit 801 is further configured to, before the RAN device sends the second grant information, send the first data to the terminal in the downlink retransmission active time, and receive feedback information sent by the terminal, where the feedback information is used to feed back a status of receiving the first data by the terminal, and the feedback information is a NACK.

Optionally, the downlink retransmission active time is determined according to a DRX retransmission timer (also referred to as drx-Retransmission Timer).

Optionally, the activation extension time is determined according to a DRX inactivity timer (also referred to as drx-Inactivity Timer).

It should be noted that the communication unit in this embodiment may be implemented by a transceiver apparatus of the RAN device. The determining unit may be a processor that is separately disposed, may be integrated into a processor of the RAN device for implementation, or may be stored in a memory of the RAN device in a form of program code, which is invoked by a processor of the RAN device to perform the function of the foregoing determining unit. In addition, generation of grant information, feedback information, and the like may be completed by a processor of the RAN device, where the processor and a processor that implements the determining unit may be a same processor, or may be different processors. The processor described herein may be a central processing unit (CPU), or an application-specific integrated circuit (ASIC), or one or more integrated circuits configured to implement this embodiment of the present disclosure.

Figure 9:
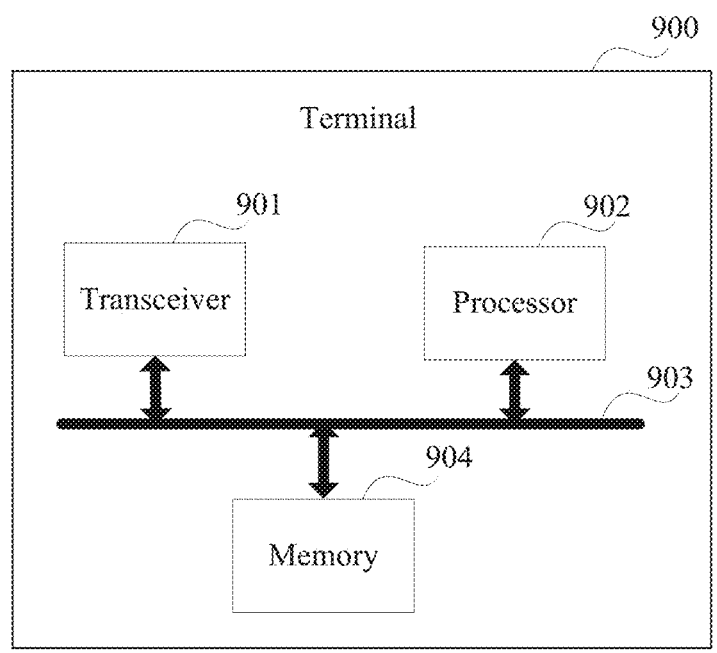
FIG. 9 is a structural diagram of a terminal according to an embodiment of the present disclosure.

Based on the foregoing embodiments, an embodiment of the present disclosure further provides a terminal, where the terminal may use the method provided in the embodiment corresponding to FIG. 3, and may be a device same as the terminal shown in FIG. 7. Refer to FIG. 9. The terminal 900 includes a transceiver 901, a processor 902, a bus 903, and a memory 904, where the transceiver 901, the processor 902, and the memory 904 are interconnected by using the bus 903, and the bus 903 may be a peripheral component interconnect (PCI) bus, an Extended Industry Standard Architecture (EISA) bus, or the like. The bus may be classified into an address bus, a data bus, a control bus, and the like, and for ease of denotation, is presented by only one bold line in FIG. 9, which, however, does not mean that there is only one bus or only one type of bus.

The transceiver 901 is configured to communicate with a RAN device, for example, receive grant information sent by the RAN device, receive data and feedback information that are sent by the RAN device, and send data, feedback information, or the like to the RAN device.

The processor 902 is configured to implement the data transmission method in the embodiment of the present disclosure shown in FIG. 3, including receiving, in a DRX active period, first grant information sent by the RAN device, where the first grant information is used to perform initial transmission grant for first data. The data transmission method further includes receiving, in a retransmission active time, second grant information sent by the RAN device, where the second grant information is used to perform initial transmission grant for second data, and the retransmission active time is an active time in which the terminal 900 expects to receive a retransmission grant for the first data. The data transmission method also includes remaining in an active state in an activation extension time that is after receiving of the second grant information.

It should be noted that descriptions of the retransmission active time, the first data, and the second data are the same as those in the foregoing method embodiments.

Optionally, the first data is empty.

Optionally, the first grant information is used to perform uplink initial transmission grant for the first data, and the retransmission active time includes an uplink retransmission active time, where the uplink retransmission active time is an active time in which the terminal 900 expects to receive an uplink retransmission grant for the first data.

Optionally, after the processor 902 receives the first grant information sent by the RAN device, and before the processor 902 receives the second grant information sent by the RAN device, the method further includes sending, by the processor 902, the first data to the RAN device according to the first grant information, and further receiving, by the processor 902 in the uplink retransmission active time, feedback information sent by the RAN device, where the feedback information is used to feed back a status of receiving the first data by the RAN device, and the feedback information is an ACK.

Optionally, the first grant information is used to perform downlink initial transmission grant for the first data, the retransmission active time includes a downlink retransmission active time, and the downlink retransmission active time is an active time in which the terminal 900 expects to receive a downlink retransmission grant for the first data.

Optionally, after the processor 902 receives the first grant information sent by the RAN device, and before the processor 902 receives the second grant information sent by the RAN device, the method further includes receiving, by the processor 902, the first data sent by the RAN device, and sending, by the processor 902, feedback information to the RAN device, where the feedback information is used to feed back a status of receiving the first data by the processor 902, and the feedback information is a NACK.

Optionally, the downlink retransmission active time is determined according to a DRX retransmission timer (also referred to as drx-Retransmission Timer).

Optionally, the activation extension time is determined according to a DRX inactivity timer (also referred to as drx-Inactivity Timer).

The terminal 900 further includes the memory 904 that is configured to store a program and the like. Specifically, the program may include program code, where the program code includes a computer operation instruction. The memory 904 may include a random access memory (RAM), or may include a non-volatile memory, for example, at least one magnetic disk memory. The processor 902 executes an application program stored in the memory 904, to implement the foregoing data transmission method.

Figure 10:
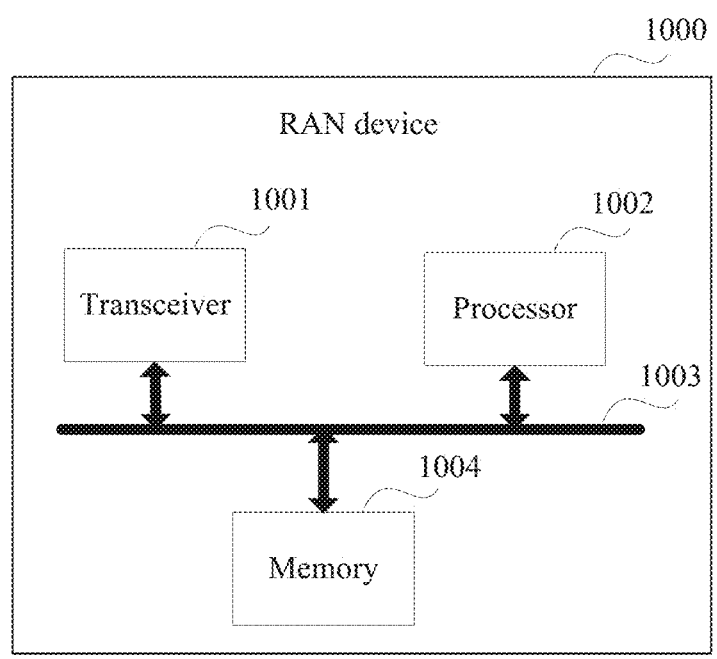
FIG. 10 is a structural diagram of a RAN device according to an embodiment of the present disclosure.

Based on the foregoing embodiments, an embodiment of the present disclosure further provides a RAN device, where the RAN device may use the method provided in the embodiment corresponding to FIG. 4, and may be a device same as the RAN device shown in FIG. 8. Referring to FIG. 10, the RAN device 1000 includes a transceiver 1001, a processor 1002, a bus 1003, and a memory 1004, where the transceiver 1001, the processor 1002, and the memory 1004 are interconnected by using the bus 1003, and the bus 1003 may be a peripheral component interconnect (PCI) bus, an Extended Industry Standard Architecture (EISA) bus, or the like. The bus may be classified into an address bus, a data bus, a control bus, and the like, and for ease of denotation, is presented by only one bold line in FIG. 10, which, however, does not mean that there is only one bus or only one type of bus.

The transceiver 1001 is configured to communicate with a terminal, for example, send grant information to the terminal, receive data and feedback information that are sent by the terminal, send data or feedback information to the terminal, and the like.

The processor 1002 is configured to implement the data transmission method in the embodiment of the present disclosure shown in FIG. 4, where the method includes sending first grant information to the terminal in a DRX active period, where the first grant information is used to perform initial transmission grant for first data. The method also includes determining a retransmission active time, where the retransmission active time is an active time in which the terminal expects to receive a retransmission grant for the first data. The method further includes sending second grant information to the terminal in the retransmission active time, where the second grant information is used to perform initial transmission grant for second data.

It should be noted that descriptions of the retransmission active time, the first data, and the second data are the same as those in the foregoing method embodiments.

Optionally, sending the first grant information to the terminal includes one or any combination of the following. Sending, by the processor 1002, the first grant information to the terminal when having downlink data to send, where the first grant information is used to perform initial transmission grant for the to-be-sent downlink data. Sending, by the processor 1002, the first grant information to the terminal when predicting that there is going to be downlink data to send, where the first data is empty, and the second data is the predicted to-be-sent downlink data. Sending, by the processor 1002, the first grant information to the terminal when receiving an SR sent by the terminal, where the first grant information is used to perform initial transmission grant for to-be-sent uplink data. Sending, by the processor 1002, the first grant information to the terminal when a BSR that is of the terminal and maintained by the processor 1002 is non-empty, where the first grant information is used to perform initial transmission grant for to-be-sent uplink data in a buffer of the terminal. Sending, by the processor 1002, the first grant information to the terminal when predicting that the terminal is going to have uplink data to send, where the first data is empty, and the second data is the predicted to-be-sent uplink data.

Optionally, the processor 1002 determines the retransmission active time according to a timing relationship.

Optionally, the first grant information is used to perform uplink initial transmission grant for the first data, and the retransmission active time includes an uplink retransmission active time, where the uplink retransmission active time is an active time in which the terminal expects to receive an uplink retransmission grant for the first data.

Optionally, after the processor 1002 sends the first grant information, and before the processor 1002 sends the second grant information, the method further includes receiving the first data sent by the terminal according to the first grant information, and further sending, by the processor 1002, feedback information in the uplink retransmission active time, where the feedback information is used to feed back a status of receiving the first data by the processor 1002, and the feedback information is an ACK.

Optionally, the first grant information is used to perform downlink initial transmission grant for the first data, the retransmission active time includes a downlink retransmission active time, and the downlink retransmission active time is an active time in which the terminal expects to receive a downlink retransmission grant for the first data.

Optionally, before the processor 1002 sends the second grant information, the method further includes further sending, by the processor 1002, the first data to the terminal in the downlink retransmission active time, and receiving, by the processor 1002, feedback information sent by the terminal, where the feedback information is used to feed back a status of receiving the first data by the terminal, and the feedback information is a NACK.

Optionally, the downlink retransmission active time is determined according to a DRX retransmission timer (also referred to as drx-Retransmission Timer).

Optionally, the activation extension time is determined according to a DRX inactivity timer (also referred to as drx-Inactivity Timer).

The RAN device 1000 further includes the memory 1004 that is configured to store a program and the like. Specifically, the program may include program code, where the program code includes a computer operation instruction. The memory 1004 may include a random access memory (RAM), or may include a non-volatile memory, for example, at least one magnetic disk memory. The processor 1002 executes an application program stored in the memory 1004, to implement the foregoing data transmission method.

In conclusion, according to the data transmission method, the terminal, and the RAN device that are provided in the embodiments of the present disclosure, the method includes sending, by a RAN device to a terminal in a DRX active period, first grant information that is used to perform initial transmission grant for first data. Second grant information is sent to the terminal in a retransmission active time in which the terminal expects to receive a retransmission grant for the first data, where the second grant information is used to perform initial transmission grant for second data. The RAN device and the terminal remain in an active state in an activation extension time that is after sending of the second grant information. The initial transmission grant may be uplink initial transmission grant or downlink initial transmission grant. In this way, the RAN device may perform initial transmission by using an uplink retransmission active time or a downlink retransmission active time, so as to extend an active time, which not only ensures use of a DRX technology, but also reduces impact of a delay. In particular, when an active period configured in a DRX parameter is relatively short, voice performance is improved, and power saving performance of a terminal is ensured by using the DRX technology, which improves user experience.

Although some preferred embodiments of the present disclosure have been described, persons skilled in the art can make changes and modifications to these embodiments once they have learned the basic inventive concept. Therefore, the following claims are intended to be construed as to cover the preferred embodiments and all changes and modifications falling within the scope of the present disclosure.

Persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed:

1. A method, comprising:
   receiving, by a terminal in a discontinuous reception (DRX) active period, first grant information sent by a radio access network (RAN) device, wherein the terminal uses the first grant information for an initial transmission grant of first data;
   receiving, by the terminal in a retransmission active time, second grant information sent by the RAN device, wherein the second grant information is used for an initial transmission grant of second data, and wherein the retransmission active time is an active time in which the terminal expects to receive a retransmission grant for the first data; and
   remaining, by the terminal, in an active state in an activation extension time, wherein the activation extension time is after the second grant information is received; and
   wherein the first grant information is used for a downlink initial transmission grant of the first data, and the retransmission active time comprises a downlink retransmission active time, and wherein the downlink retransmission active time is an active time in which the terminal expects to receive a downlink retransmission grant for the first data.

2. The method according to claim 1, wherein the first data is empty.

3. The method according to claim 1, further comprising:
   receiving, by the terminal, the first data sent by the RAN device; and
   sending, by the terminal, feedback information to the RAN device, wherein the feedback information provides a status of receiving the first data by the terminal, and the feedback information indicates an unsuccessful acknowledgement (NACK).

4. The method according to claim 1, wherein the downlink retransmission active time is determined according to a DRX retransmission timer.

5. The method according to claim 1, wherein the activation extension time is determined according to a DRX inactivity timer.

6. A device, comprising:
   a processor; and
   a non-transitory computer-readable storage medium storing a program to be executed by the processor, the program including instructions to:
      receive, in a discontinuous reception (DRX) active period, first grant information sent by a radio access network (RAN) device, wherein the first grant information is used for an initial transmission grant of first data;
      receive, in a retransmission active time, second grant information sent by the RAN device, wherein the second grant information is used for an initial transmission grant of second data, and the retransmission active time is an active time in which a terminal expects to receive a retransmission grant for the first data; and
      remain in an active state in an activation extension time, wherein the activation extension time is after the second grant information is received; and
      wherein the first grant information is used for a downlink initial transmission grant of the first data, and the retransmission active time comprises a downlink retransmission active time, and wherein the downlink retransmission active time is an active time in which the terminal expects to receive a downlink retransmission grant for the first data.

7. The device according to claim 6, wherein the first data is empty.

8. The device according to claim 6, wherein the program further includes instructions to:
   receive the first data sent by the RAN device; and
   send feedback information to the RAN device, wherein the feedback information provides a status of receiving the first data by the terminal, and the feedback information indicates an unsuccessful acknowledgement (NACK).

9. The device according to claim 6, wherein the downlink retransmission active time is determined according to a DRX retransmission timer.

10. The device according to claim 6, wherein the activation extension time is determined according to a DRX inactivity timer.

11. The device according to claim 6, wherein the device is coupled to the terminal, or the device is the terminal.

12. A radio access network (RAN) device, comprising:
    a processor; and
    a non-transitory computer-readable storage medium storing a program to be executed by the processor, the program including instructions to:
       send first grant information to a terminal in a discontinuous reception (DRX) active period, wherein the first grant information is used for initial transmission grant of first data;
       determine a retransmission active time, wherein the retransmission active time is an active time in which the terminal expects to receive a retransmission grant for the first data; and
       send second grant information to the terminal in the retransmission active time, wherein the second grant information is used for initial transmission grant of second data; and
    wherein the first grant information is used for a downlink initial transmission grant of the first data, and the retransmission active time comprises a downlink retransmission active time, and wherein the downlink retransmission active time is an active time in which the terminal expects to receive a downlink retransmission grant for the first data.

13. A non-transitory computer readable medium comprising a program, wherein the program is executable by a processor to:
    receive, in a discontinuous reception (DRX) active period, first grant information sent by a radio access network (RAN) device, wherein the first grant information is used for initial transmission grant of first data;
    receive, in a retransmission active time, second grant information sent by the RAN device, wherein the second grant information is used for initial transmission grant of second data, and the retransmission active time is an active time in which a terminal expects to receive a retransmission grant for the first data; and remain in an active state in an activation extension time that is after receiving of the second grant information; and wherein the first grant information is used for downlink initial transmission grant of the first data, wherein the retransmission active time comprises a downlink retransmission active time, and wherein the downlink retransmission active time is an active time in which the terminal expects to receive a downlink retransmission grant for the first data.

* * * * *